United States Patent [19]

Koseki et al.

[11] 4,363,219
[45] Dec. 14, 1982

[54] METHOD AND SYSTEM OF HEAT ENERGY CONVERSION

[75] Inventors: Yasuo Koseki; Akira Yamada; Yuusaku Nishimura; Sankichi Takahashi, all of Ibaraki, Japan

[73] Assignee: Hitachi, Ltd., Tokyo, Japan

[21] Appl. No.: 244,678

[22] Filed: Mar. 17, 1981

[30] Foreign Application Priority Data

Mar. 17, 1980 [JP] Japan ................................. 55-32757
Mar. 31, 1980 [JP] Japan ................................. 55-40331

[51] Int. Cl.³ .......................................... F25B 15/00
[52] U.S. Cl. ........................................ 62/101; 62/476
[58] Field of Search .............................. 62/101, 476

[56] References Cited

U.S. PATENT DOCUMENTS 2,193,535  3/1940  Maiuri .................................. 62/101
3,608,326  9/1971  Leonard, Jr. ........................ 62/101

Primary Examiner—Lloyd L. King
Attorney, Agent, or Firm—Antonelli, Terry & Wands

[57] ABSTRACT

A method and system of converting low-temperature energy into high-temperature energy comprises steps of concentrating a high-boiling liquid diluted with a low-boiling liquid through evaporation of the low-boiling liquid; condensing the vapor of the low-boiling liquid through its absorption into an intermediate heat medium liquid, while cooling, evaporating the diluted intermediate heat medium, and absorbing the vapor generated in the last step into the concentrated high-boiling liquid thereby generating dilution heat and phase-change heat. The intermediate heat medium has the property that the difference between the saturation temperature thereof and the saturation temperature of the high-boiling liquid becomes small under a low pressure and the difference between the saturation temperatures of both the liquids becomes large under a high pressure.

14 Claims, 5 Drawing Figures

METHOD AND SYSTEM OF HEAT ENERGY CONVERSION

BACKGROUND OF THE INVENTION

This invention relates to a method of and a system for converting heat energy of a relatively low temperature into energy of a relatively high temperature, and more particularly to a heat energy conversion method and a system therefor, in which energy conversion is effected more effectively between energies of a small temperature difference.

As methods of recovering heat energy of a low temperature level and converting it into energy of a high temperature, there are various methods. In these methods, a method which employs a so-called absorption heat pump is known.

In the method, a high-boiling liquid (for example, LiCl liquid) diluted with a low-boiling liquid (for example, $H_2O$) is concentrated up to $C_2$% through evaporation with energy of low-temperature $T_2$ at a pressure $P_1$ which is the vapor pressure of the low-boiling liquid to a temperature $T_1(<T_2)$. The vapor generated in this step of evaporation is condensed by energy of low-temperature $T_1$ at the pressure $P_1$. The condensed low-boiling vapor is heated and evaporated by energy of low-temperature $T_2$ at the pressure $P_2$ which is the vapor pressure of the low-boiling liquid to the temperature $T_2$. The vapor is absorbed into the concentrated high-boiling liquid at the pressure $P_2$ and diluted to $C_1$%, and here the dilution heat of the high-boiling liquid and the phase-change latent heat are generated so that the heat medium has its temperature elevated up to the saturation temperature $T(T_1<T_2<T)$ of concentration $C_1$% under the vapor pressure $P_2$.

As described above, the method can exploit the dilution heat of the high-boiling liquid and the phase-change latent heat of the low-boiling vapor, the thermal efficiency therefore is high. However, the highest rise temperature $T'$ is limited by the concentration $C_1$% of the high-boiling liquid and the pressure $P_2$ at that time. Accordingly, when the temperatures ($T_1$, $T_2$) of the relatively low-temperature energies are low, and the temperature difference $\Delta T(T_2-T_1)$ of both the energies is small, the pressure $P_2$ also becomes small and the concentration $C_1$ becomes low, resulting in the disadvantage that the highest rise temperature becomes low.

SUMMARY OF THE INVENTION

An object of this invention is to eliminate the disadvantage of the prior art and to provide a method and a system, wherein energy of a low temperature can be converted into energy of a higher temperature by increasing the heat of dilution.

Another object of the invention is to provide a method and a system, in which energy of a low temperature is converted into energy of a higher temperature with high thermal efficiency.

This invention employs an intermediate medium of liquid having prescribed characteristics, thereby making it possible to concentrate a high-boiling liquid through evaporation of a low-boiling liquid and absorption of the vapor generated by the evaporation into the intermediate medium liquid under a low pressure and dilute the concentrated high-boiling liquid under a high pressure.

For example, one of the characteristics is that the intermediate medium liquid has the property that the difference between the saturation temperature thereof and the saturation temperature of the high-boiling liquid becomes small under a low pressure and the difference between the saturation temperatures of both the liquids becomes large under a high pressure. Another characteristic is that the intermediate medium liquid has the property of presenting an endothermic reaction in case of absorbing the vapor of the low-boiling liquid.

DESCRIPTION OF THE PREFERRED EMBODIMENTS

An embodiment of a method and a system of converting energy of a low temperature into energy of a higher temperature will be described hereinafter in detail, referring to FIG. 1.

Figure 1:
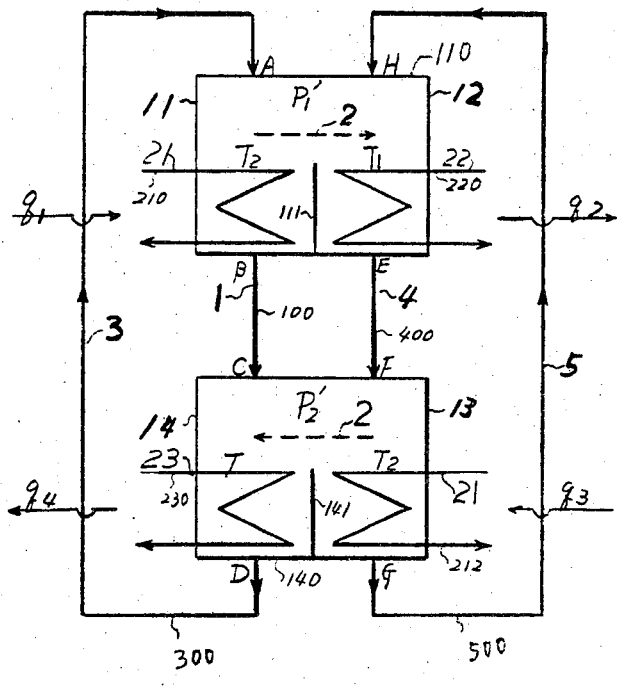
FIG. 1 is a schematic diagram of a cycle and a system for converting energy of a low-temperature into energy of a high-temperature according to an embodiment of the invention.

In FIG. 1, the system, which is called an absorption heat pump, comprises a concentration section 11, an intermediate absorbing section 12, an intermediate evaporating section 13, and an absorbing and heat generating section 14. The concentration section 11 and an intermediate absorbing section 12 are constructed of a closed housing 110 and a partition wall 111 dividing the inner and lower portion of the housing 110 into the two sections 11 and 12, and provided with a heater 210 and a cooler 220, respectively. The closed housing 110 is kept at a predetermined pressure $P_1'$. The absorption and heat generation section 14 and intermediate evaporating section 13 also are constructed of a closed housing 140 and a partition wall 141 thereby dividing the inner and lower portion of the closed housing 140 into the two sections 13 and 14, and provided with a heat exchanger 230 and a heater 212, respectively. The closed housing 140 is kept at a predetermined pressure $P_2'$.

The concentration section 11 communicates with the absorption and heat generation section 14 through a line 100 with a pump (not shown) and a line 300. The intermediate absorbing section 12 also is connected to the intermediate evaporation section 13 by a line 400 with a pump not shown and a line 500.

Figure 2:
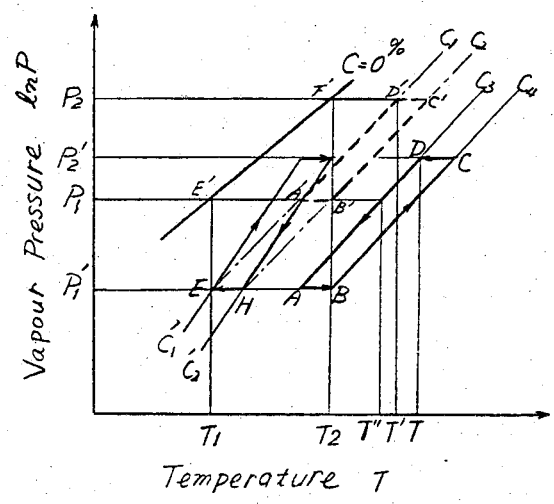
FIG. 2 is a P-T diagram in the cycle shown in FIG. 1.

Next, heat energy conversion cycle on the above-mentioned system will be explained hereinafter, referring to FIGS. 1 and 2. FIG. 2 is a P-T diagram showing the relation between the vapor pressure (P) and the temperature (T) in the cycle illustrated in FIG. 1. Symbols A—H indicated in FIGS. 1 and 2 are common and the state of the relation between the vapor pressure and the temperature in the process or position A—H is illustrated in FIG. 2.

In this cycle, as energy of relatively low temperature, heat energy 22 of temperature $T_1$ and heat energy 21 of temperature $T_2(T_1<T_2)$ are employed to obtain heat energy of relatively high temperature $T(T_2<T)$. As a heat medium of liquid a mixture of LiCl liquid as a high-boiling liquid and $H_2O$ as a low-boiling liquid is used. And as an intermediate medium, there is used a liquid having a property that the intermediate medium can absorb vapor, generated during a concentrating process of the mixture through evaporation of the high-boiling liquid diluted with the low-boiling liquid condensed. As for the intermediate medium, it is preferable that its evaporation temperature is higher where the surrounding pressure is higher, and it is near the boiling point of water where the surrounding pressure is lower.

Referring back to the cycle, the high-boiling liquid 3 is diluted with the low-boiling liquid (water) in the absorbing and heat generating section 14 through absorption to become a dilute high-boiling liquid 3 (its concentration:$C_3\%$). The dilute high-boiling liquid 3 enters the concentration section 11, (A), and it is heated here by the heater 210 fed with low-temperature energy 21 under the conditions of the pressure $P_1'$ and the temperature $T_2$ to generate vapor 2 of the low-boiling liquid, whereby the dilute high-boiling liquid is concentrated up to a concentration $C_4\%$ ($<C_2\%$), (B). The vapor 2 of the low-boiling liquid generated in the concentration section 11 is introduced into the intermediate absorbing section 12 at a temperature $T_1$ under the same pressure as that of the concentration section 11. The intermediate absorbing section 12 is supplied with an intermediate medium of liquid 5 of concentration $C_2'\%$. This embodiment employs the intermediate medium of liquid having a property that the P-T line thereof in P-T diagram as shown in FIG. 2 and showing the relationship between the vapor pressure (P) and the temperature (T) in the present cycle has a gradient greater than that of the P-T line of the high-boiling liquid in the same P-T diagram, as above-mentioned. In the intermediate absorbing section 12, the vapor 2 is absorbed by the intermediate medium of liquid 5 (its concentration $C_2'$) while being cooled by the cooler 220 supplied with low-temperature energy 22 of temperature $T_1$, so that the intermediate medium is diluted from the concentration of $C_2'\%$ to the concentration $C_1'\%$ (E). The diluted intermediate medium liquid 4 flows into the intermediate evaporation section 13 under the condition of a pressure $P_2'(P_1<P_2'<P_2)$ (F), and here it is heated by the low-temperature energy 21 at a temperature $T_2$ to again vaporize and separate the vapor 2 of the low-boiling liquid and to be condensed up to the concentration $C_2'\%$ (G). The concentrated intermediate medium of liquid 5 is transferred into the intermediate absorbing section 12 again through the line 500 to circulate.

On the other hand, the high-boiling liquid 1 concentrated up to the concentration $C_4\%$ in the concentrating section 11 is introduced into the absorbing and heat generating section 14, and the vapor 2 of the low-boiling liquid produced in the intermediate evaporation section 13 is absorbed by the concentrated high-boiling liquid 1, to generate heat and to be brought into the saturation temperature T of the concentration $C_3\%$ ($>C_1\%$) and the pressure $P_2'(D)$, so that the high-temperature energy corresponding substantially to the rise temperature is obtained.

In FIG. 2, a P-T diagram (indicated by chain lines) illustrative of the relationships between the pressures ($P_1$, $P_2$) and temperatures ($T_1$, $T_2$) of the respective parts in the prior art described in the background of the invention and the temperature (T') of the high-temperature energy obtained in this P-T diagram are shown for the sake of comparison. Further, in FIG. 2, the pressure ($P_1'$, $P_1$) within the system and the arrival temperature T'' of the high-temperature energy in the case of employing the high-boiling liquid as the intermediate medium liquid (that is, in the case where the gradient of the P-T diagram of the intermediate medium liquid coincides with that of the P-T diagram of the high-boiling liquid) are mentioned as reference examples.

According to the present embodiment, by adding the low-temperature energies ($T_1$, $T_2$) at the same temperature, the high-boiling liquid can be concentrated up to the higher concentration ($C_4\%$ $>C_2\%$) and the enriched liquid can be diluted, and hence, the energy at the higher temperature (T$>$T') can be obtained when the embodiment is compared with the above-mentioned prior art. Further, in the present embodiment, the absorbing and heat generating section 14 can be operated under the higher pressure ($P_2'>P_1$), and hence, the energy of the higher temperature (T$>$T'') can be obtained when the embodiment is compared with the reference example employing the high-boiling liquid as the intermediate medium liquid.

Figure 3:
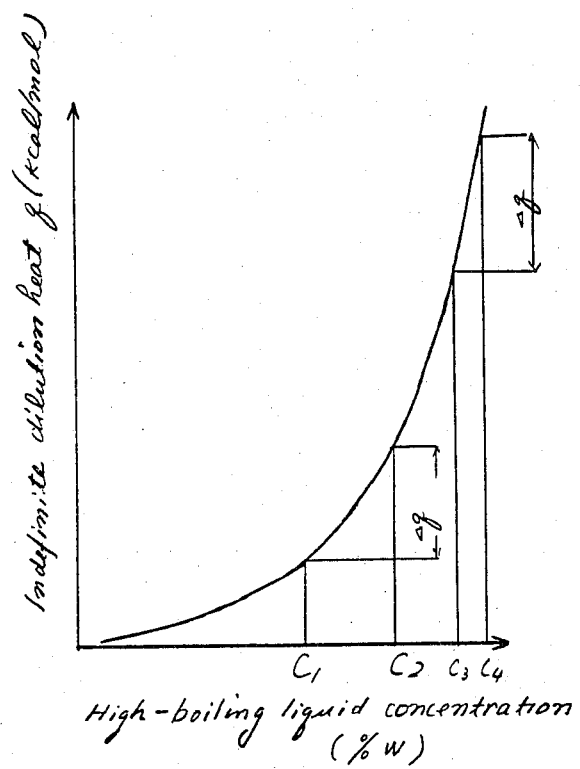
FIG. 3 is a diagram of the relation between the liquid concentration and the dilution heat.

As shown in FIG. 3, the high concentration side of the high-boiling liquid has the heat of dilution increased exponentially. Therefore, according to this embodiment, a larger amount of dilution heat can be obtained.

In this embodiment, when waste water of temperatures 30° C. and 50° C. as energies of low-temperatures $T_1$, $T_2$, water solution of LiCl as the high-boiling liquid, and water as the low-boiling liquid are employed, $P_1'$ and $P_2'$ are 5 mmHg and 17 mmHg, respectively, and high temperature energy of 71° C. is obtained. In this case, as the intermediate medium liquid, a mixture of $CaCl_2$:32%, $MgCl_2$:8%, $L_1Cl$:3%, and water:remaining is used.

Figure 4:
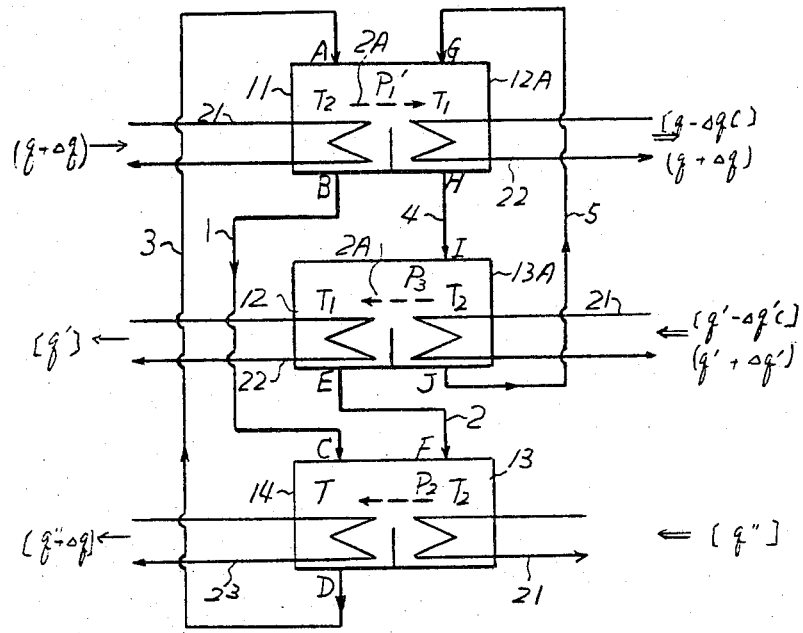
FIG. 4 is a schematic diagram of a cycle and a system for converting energy of a low-temperature into energy of a high-temperature according to another embodiment of the invention.
Figure 5:
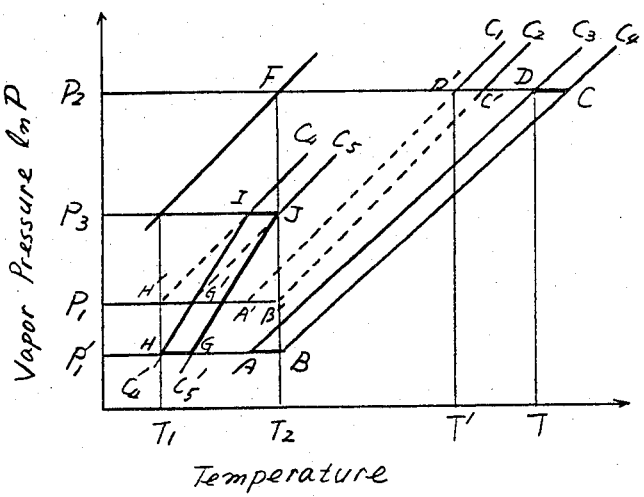
FIG. 5 is a P-T diagram in the cycle shown in FIG. 4.

Now, a method in which the dilution and concentration or enrichment of the intermediate medium liquid are performed in a multistage fashion is illustrated in FIG. 4 as another embodiment of this invention, and FIG. 5 is a P-T diagram showing the relations between the vapor pressure and the temperature in various steps A-J illustrated in FIG. 4. Referring to FIG. 4, the high boiling liquid 3 is heated by the low-temperature energy 21 in the concentration section 11 under the pressure $P_1'$, to have the vapor 2A of the low-boiling liquid vaporized and separated to be concentrated into the high-boiling liquid of the concentration $C_4\%$ (B). The vapor 2A of the low-boiling liquid produced in the concentration section 11 is introduced into the intermediate absorbing section 12A at the temperature $T_1$ under the same pressure as that of the concentration section 11. The intermediate absorbing section 12A is supplied with the intermediate medium liquid 5 of a concentration $C_5'\%$, and here the vapor 2A of the low-boiling liquid is absorbed by the intermediate medium liquid 5 while being cooled by the low-temperature energy 22. Thus, the intermediate medium liquid 5 is diluted down to the concentration $C_4'\%$ (H). The diluted intermediate medium liquid 4 flows into the intermediate vaporizing section 13A under a higher pressure $P_3$ (I), and here it is heated under the condition of the temperature $T_2$, to have the vapor 2A of the low-boiling liquid vaporized and separated and to be enriched up to a concentration $C_5'\%$ (J). The concentrated intermediate medium liquid 5 is recirculated into the intermediate absorbing section 12A (G).

On the other hand, the vapor 2A of the low-boiling liquid vaporized and separated in the intermediate evaporation section 13A is cooled and liquefied in the condensing section 12 at the temperature $T_1$ (E), and a resultant liquid flows into the evaporation section 13 under the condition of the higher pressure $P_2$ (F). IN the evaporation section 13, the low-boiling liquid is heated under the condition of the temperature $T_2$ and becomes the vapor 2A of the low-boiling liquid, which enters the absorbing and heat generating section 14 under the same pressure as that of the evaporation section 13 and is absorbed by the high-boiling liquid 1 here (D). The high-boiling liquid 3 thus diluted down to the concentration $C_3\%$ is returned to the concentration section 11 again (A). In the absorbing and heat generating section 14, the temperature is raised up to the saturation temperature T of the pressure $P_2$ and the concentration $C_3\%$, and the high-temperature energy 23 corresponding substantially to the raised temperature is obtained.

In FIG. 5, the pressures within the system and the arrival temperature T' of the high-temperature energy in the case of employing the high-boiling liquid as the intermediate medium liquid as it is (that is, in the case where the gradient of the P-T line of the intermediate medium liquid coincides with that of the P-T line of the high-boiling liquid) are mentioned as a reference example.

According to the present embodiment, the operation of concentrating the high-boiling liquid can be made under the lower pressure ($P_1' < P_1$), and hence, the high-boiling liquid of the higher concentration ($C_4\% > C_2\%$) is obtained, so that the heat generation temperature is higher (T>T').

In this invention, when the low-boiling liquid is water; NaOH, ($CaCl_2$+LiCl), $CaCl_2$, $MgBr_2$ etc. and a mixture thereof can be mentioned as the intermediate medium liquid, and MgCl, LiBr, $H_2SO_4$, $ZnCl_2$ etc. and a mixture thereof can be mentioned as the high-boiling liquid.

Further, when a liquid having the property of absorbing heat in case of absorbing the vapor of the low-boiling liquid is selected as the intermediate medium liquid, the amounts of heat in the intermediate vaporizing section and the intermediate absorbing section is enhanced. In this case, cycle corresponding to FIG. 4 is expressed by dotted lines in FIG. 5. Referring to FIG. 1 and FIG. 4, heat balance will be studied hereinafter.

The heat balance in the cycle shown in FIG. 1 is as follows;

Concentration section
    heat input $q_1$=q(evaporation heat of vapor 2)+$\Delta q$(concentration heat=dilution heat)

Condensing section
    wasted heat $q_2$=q−$\Delta q$(absorbing heat during dilution)

Intermediate evaporation section
    heat input $q_3$=q'(evaporation heat under pressure $P_2'$)−$\Delta q_c'$ Absorbing and heat generating section
    heat recovery $q_4$=q'+$\Delta q$.

The thermal efficiency $\eta$ of this cycle is as follows;

$$\zeta = \frac{\text{heat recovery}}{\text{(heat input)}} = \frac{q' + \Delta q}{q' + q + (\Delta q - \Delta q'_c)}.$$

In the same manner as the above, the heat balance of the prior art described in the background of the invention is as follows:

Concentration section
    heat input $q_1'$=q+$\Delta q$

Condensation section
    wasted heat $q_2'$=q

Evaporation section
    input heat $q_3'$=q'(evaporation heat under pressure $P_2$)

Absorbing and heat generation
    recovery heat $q_4'$=q'+$\Delta q$

Therefore, the thermal efficiency $\eta'$ is given as follows;

$$\zeta' = \frac{\text{recovery heat}}{\text{heat input}} = \frac{q' + \Delta q}{q' + (q + \Delta q)}$$

In comparison of $\eta$ and $\eta'$, $\Delta q_c'$ due to absorption heat of the intermediate medium liquid is served as improvement on the thermal efficiency.

In heat balance in the cycle of FIG. 4, referring to symbols expressed in the upper stage in FIG. 4, $$\text{thermal efficiency } \zeta'' = \frac{\text{heat recovery}}{\text{input heat}} = \frac{q'' + \Delta q}{q + q'' + q' + \Delta q - \Delta q'_c}$$

If the high-boiling liquid as the intermediate medium is used, the thermal efficiency $\eta'''$ is as follows;

$$\zeta''' = \frac{q'' + \Delta q}{q + q'' + q' + \Delta q' + \Delta q}.$$

Therefore, when the intermediate medium having the property of absorbing heat in its dilution is used, the thermal efficiency is improved by ($\Delta q'+\Delta q_c'$) compared with the use of the high-boiling liquid. In this embodiment, $H_2SO_4$, $HNO_3$, NaOH, LiCl, lithium bromide, etc. as the high-boiling liquid, water as the low-boiling liquid, and $Na_2CO_3$, Sodium hydrogenphosphate etc. as the intermediate medium liquid can be used.

We claim:

1. A method of converting low temperature heat energy into high temperature heat energy comprising steps of, concentrating a heat medium of liquid having components of unequal boiling points through evaporation of lower-boiling liquid under a first predetermined pressure, and absorbing vapor generated under a second predetermined pressure into higher-boiling liquid concentrated, wherein the improvement comprises the steps of:

absorbing vapor of the lower-boiling liquid generated in the concentrating step into an intermediate medium of liquid while cooling, said intermediate medium of liquid being different from both the lower-boiling liquid and higher-boiling liquid and having a boiling point between the lower boiling point and the higher boiling point of the heat medium;

evaporating the intermediate medium diluted with the lower-boiling liquid to generate vapor; and absorbing the vapor generated from the diluted intermediate medium of liquid into the concentrated higher-boiling liquid.

2. The method as defined in claim 1, wherein said evaporating step of the intermediate medium is effected in multistage fashion.

3. The method as defined in claim 1 or 2, wherein said intermediate medium of liquid has a property that the difference in saturation temperature between the intermediate medium of liquid and the higher-boiling liquid at a lower vapor pressure is smaller than at a higher vapor pressure.

4. The method as defined in claim 1 or 2 wherein said intermediate medium of liquid has a property of presenting an endothermic reaction in case of absorbing the vapor of the low-boiling liquid.

5. The method as defined in claim 3, wherein said intermediate medium of liquid comprises $CaCl_2$, $MgCl_2$ and LiCl, and the weight ratio of them is 10.7:2.7:1.

6. A system for converting energy of a low-temperature into energy of a high temperature comprising:
 means having heating means for concentrating a heat medium of liquid having components of unequal boiling points under a predetermined pressure;
 means, communicating with said concentrating means and having heat exchanging means, for absorbing under the first predetermined pressure the vapor generated by said concentrating means into an intermediate medium of liquid, which intermediate medium of liquid is different from said heat medium and has an intermediate boiling point between the upper-boiling liquid and lower-boiling liquid of the heat medium of liquid; means for evaporating the intermediate medium of liquid supplied from said absorbing means under a second predetermined pressure;
 means for transferring the intermediate medium of liquid concentrated in said evaporating means to said absorbing means;
 means, communicating with said evaporating means, for absorbing the vapor generated in said evaporating means into the heat medium supplied from said concentrating means to generate heat under the second predetermined pressure; and
 means for transferring the heat medium, diluted by absorption of said vapor generated in said evaporating means, to said concentrating means.

7. The system as defined in claim 6, wherein said evaporating means is constructed in multistage fashion.

8. A method of converting low temperature heat energy into high temperature heat energy comprising the steps of:
 concentrating a heat medium of liquid having components of unequal boiling points through evaporation of a lower-boiling liquid of said heat medium under a first predetermined pressure by receiving heat energy of a first predetermined temperature;
 absorbing the vapor of the lower-boiling liquid generated in the concentrating step into an intermediate medium of liquid having a property that a P-T line on the P-T diagram expressing a relation between vapor pressure (P) and temperature (T) has a larger gradient than that of a higher-boiling liquid of said heat medium, while cooling the vapor and the intermediate medium of liquid by heat energy of a second predetermined temperature lower than the first predetermined temperature;
 evaporating, under a second predetermined pressure, vapor of the lower-boiling liquid absorbed in the intermediate medium of liquid by receiving a relatively low temperature energy; and
 absorbing the vapor generated in the evaporating step into the heat medium concentrated in said concentrating step, thereby generating heat energy of a higher temperature than the first predetermined temperature.

9. The method as defined in claim 8, wherein said evaporating step comprises the steps of:
 evaporating under a third predetermined pressure of a value between the first and second predetermined pressures the intermediate medium of liquid from said step of absorption of the vapor of the lower-boiling liquid into the intermediate medium of liquid;
 condensing the vapor generated through evaporation of the intermediate medium of liquid under the third predetermined pressure to make condensate; and
 evaporating the condensate under the second predetermined pressure.

10. The method as defined in claim 1 or 8, wherein the intermediate medium remaining after said evaporating step is transferred to the step of absorbing vapor of the lower-boiling liquid generated in the concentrating step.

11. The method defined in claim 10, wherein the heat medium diluted by absorbing the vapor generated from the diluted intermediate medium is transferred to the step of concentrating the heat medium.

12. The method defined in claim 1 or 8, wherein the heat medium diluted by absorbing the vapor generated from the diluted intermediate medium is transferred to the step of concentrating the heat medium.

13. The method defined in claim 1 or 8, wherein the intermediate medium of liquid is selected from the group consisting of NaOH, ($CaCl_2$ and LiCl), $CaCl_2$, $MgBr_2$ and mixtures thereof.

14. The method defined in claim 13, wherein the lower-boiling liquid is water, and the higher-boiling liquid is selected from the group consisting of MgCl, LiBr, $H_2SO_4$, $ZnCl_2$ and mixtures thereof.

* * * * *